United States Patent [19]

Hayashi et al.

[11] Patent Number: 5,667,822
[45] Date of Patent: Sep. 16, 1997

[54] SHAPING MOLD FOR MAKING ULTRA-THIN SHAPED RUBBER ARTICLES

[75] Inventors: Tomoyuki Hayashi, Tokyo; Yoshiaki Tatsumi; Kinya Miyashita, both of Kawasaki, all of Japan

[73] Assignees: Sohzohkagaku Co., Ltd., Kanagawa-ken; Nisshinbo Industries, Inc., Tokyo, both of Japan

[21] Appl. No.: 657,659

[22] Filed: May 31, 1996

Related U.S. Application Data

[62] Division of Ser. No. 133,128, Oct. 20, 1993.

[30] Foreign Application Priority Data

Feb. 21, 1992 [JP] Japan ............................. 4-21007
Oct. 14, 1992 [JP] Japan ............................. 4-81880

[51] Int. Cl.⁶ .................... B29C 41/14; B29C 41/40; B29C 41/46
[52] U.S. Cl. .................... 425/275; 249/78; 249/134; 249/175; 425/169; 425/DIG. 13
[58] Field of Search ................ 425/275, 269, 425/174.6, DIG. 13, 577; 249/78, 134, 80, 175; 264/404, 215, 305, 337

[56] References Cited

U.S. PATENT DOCUMENTS

| | | | |
|---|---|---|---|
| 2,228,992 | 1/1941 | Fry | 425/275 |
| 2,867,847 | 1/1959 | Miller et al. | |
| 2,893,085 | 7/1959 | Johansson et al. | 249/78 |
| 3,850,563 | 11/1974 | Milonas et al. | |
| 3,966,871 | 6/1976 | Schroder | |
| 4,001,359 | 1/1977 | Fisher et al. | |
| 4,104,343 | 8/1978 | Cornelius | |
| 4,340,348 | 7/1982 | Kurtz | |
| 4,822,270 | 4/1989 | Bonissone et al. | 249/78 |
| 5,116,551 | 5/1992 | Davidson et al. | |
| 5,176,866 | 1/1993 | Tanaka et al. | 425/DIG. 13 |
| 5,246,198 | 9/1993 | Kurihara | |
| 5,323,544 | 6/1994 | Osgood | |
| 5,336,322 | 8/1994 | Tobisawa et al. | |

FOREIGN PATENT DOCUMENTS

| | | |
|---|---|---|
| 47-17474 | 5/1972 | Japan. |
| 1-108012 | 4/1989 | Japan. |
| 1-52167 | 6/1990 | Japan. |
| 2-503888 | 11/1990 | Japan. |
| 2-30507 | 1/1991 | Japan. |
| 2-4750 | 2/1991 | Japan. |
| 1549764 | 3/1990 | U.S.S.R. |
| WO88/09092 | 11/1988 | WIPO. |

*Primary Examiner*—Khanh P. Nguyen
*Attorney, Agent, or Firm*—Birch, Stewart, Kolasch & Birch, LLP

[57] ABSTRACT

A shaping mold for the production of ultra-thin shaped rubber articles, has a main body which is dipped into a latex liquid so as to make the latex adhered to the surface of the main body. The adhered latex is heat-dried to form an ultra-thin shaped rubber article over the surface. The mold is such that at least the surface of its main body is made of an amorphous carbon and that its bottom part is fitted with electrifying electrodes and has therebetween a heating area to be heated by resistance heating due to its electrification. The same shaping mold from its dipping step through the inspecting step of inspecting the shaped article as adhered to the surface of the mold. In the heat-drying step of the method, the shaped article as adhered to the surface of the shaping mold is heated and dried from the inside of the mold with preventing as much as possible formation of pin holes in the shaped article.

11 Claims, 7 Drawing Sheets

SHAPING MOLD FOR MAKING ULTRA-THIN SHAPED RUBBER ARTICLES

This application is a Divisional of copending application Ser. No. 08/133,128, filed on Oct. 20, 1993, the entire contents of which are hereby incorporated by reference.

TECHNICAL FIELD

The present invention relates to a shaping mold for production of ultra-thin shaped rubber articles, for example, condoms as a contraceptive device, medical rubber gloves to be used in the field of medical treatment such as surgical rubber gloves, and working rubber gloves to be used in the working filed of high-technology industry or the like so as to create a clean working environment therein and also to accurately carry out fine works therein, and it also relates to a method for producing such ultra-thin shaped rubber articles by the use of the shaping molds.

BACKGROUND ART

Ultra-thin shaped rubber articles such as condoms and others are generally produced by a process of using shaping molds made of glass or porcelain, a number of which shaping molds are mounted on an endless belt at determined intervals. The process comprises many steps, including a washing step of washing the shaping molds with water in a washing tank, a dipping step of dipping the shaping molds successively in a latex liquid so as to make the latex adhere to the surfaces of the shaping molds, a heat-drying step of heating and drying the latex as adhered to the surfaces of the shaping molds for curing it thereon, and an inspecting step of dipping the shaped articles as shaped with the shaping molds in an electrolytic solution for effecting pin hole inspection of the articles by applying an electric current to the solution.

However, in accordance with the conventional process, the shaped article as adhered to the surface of the shaping mold is released from the surface after the heat-drying step. The released article is then mounted on an electroconductive inspecting mold for its pin hole inspection, and it must be dipped into an electrolytic solution as it is on the mold while applying an electric current to the solution for the inspection. Since the shaped article is an ultra-thin rubber article, the operation of peeling the shaped article from the shaping mold and of re-mounting the article to the inspecting mold in the inspecting step is extremely troublesome. Therefore, the inspecting step has been a stage of seriously retarding the process of producing ultra-thin shaped articles such as condoms and others.

In order to overcome the problem, a process has been proposed in which the shaping mold is made of a metal material and the shaped article, as heat-dried and adhered to the surface of the shaping mold is directly dipped into the electrolytic solution in the inspecting step for effecting the pin hole inspection (Japanese Patent Publication No. 47-17,474). However, since the process uses a shaping mold made of a metal material, metal ions go into the latex from the shaping mold so that the condition of the colloid sol containing rubber as a dispersion medium is thereby worsened and good adhesion of the latex to the surface of the shaping mold becomes impossible, with the result that the process produces many defective articles. Because of this reason, the process has not been put to practical use.

We the present inventors have proposed, in order to overcome the above-mentioned problem, a shaping mold for producing ultra-thin shaped rubber articles, which shaping mold is made of an electroconductive ceramic material of SiC or $ZrB_2$ or a mixture of them so that it may directly be used also as an inspecting mold as it is, whereby the troublesome operation of "peeling the shaped article from the shaping mold followed by remounting the article to a different inspecting mold" may be omitted (Japanese Patent Application Laid-Open No. 1-108,012). Using the shaping mold made of an electroconductive ceramic material, the problem that metal ions go into the latex in the dipping step may be overcome and production of ultra-thin shaped rubber articles may be effected continuously from the washing step to the successive dipping step, heat-drying step and inspecting step in order. The use of the shaping mold therefore yields a benefit of improving the production efficiency.

However, where the shaping mold is made of an electroconductive ceramic material in this way, not only the electroconductive ceramic material is high-priced of itself but also it has a large specific gravity. Therefore, the shaping mold is unsuitable for constituting a production line having therein a large amount of shaping molds as mounted on an endless belt. In addition, since the shapability of the material is bad such that the shape of the mold to be made of the material is limited. If a shaping mold having a possibly complicated shape is desired to be made of the material, polishing is needed for grinding or mirror-finishing the surface of the mold, which causes another problem of requiring much labor and cost for the grinding and mirror-finishing. Because of these reasons, the proposed shaping mold could not be said to be always satisfactory. In producing a shaping mold from an electroconductive ceramic material, a binder is incorporated into a powder of the ceramic material to prepare a compound. The compound is shaped into a non-sintered shaped body having the same shape as the intended shaping mold. The non-sintered shaped body thus obtained is then sintered at a determined sintering temperature to give the intended shaping body made of an electroconductive ceramic material, whereupon the shaped body could not be in a condition to be such an easily workable non-sintered shaped body that its surface may well be ground to have various shapes or its surface may well be polished to be a mirror-finished surface but the surface of the sintered body having a high hardness must be ground or mirror-finished by polishing.

In addition, in carrying out the process of producing ultra-thin shaped rubber articles such as condoms and others comprising the washing step, the dipping step, the heat-drying step and the inspecting step, the thickness of the shaped articles to be produced by the process is extremely small so that pin holes are easily formed in the shaped articles when the solvent is removed from the latex as adhered to the surface of the shaping mold in the heat-drying step. This is still another problem. Regarding the problem, it is not always clear as to why such pin holes are formed by what reasons, but by the present inventor's studies, it may be considered that when the heat-drying of the latex as adhered to the surface of the shaping mold is effected only by an external heat, only the surface of the layer of the latex is always dried first and thereafter the inside of the layer of the latex is to be dried successively, and that the volatile components as vaporized due to the drying of the inside of the layer of the latex would destroy the surface of the previously dried layer of the latex to go out to the outside, which would be one of the serious reasons of forming pin holes in the shaped articles. In particular, when condoms are produced by the process, the thickness of them is generally extremely small or is approximately from 0.02 mm to 0.1 mm and production of defective articles having pin holes is not allowable because of their characteristics so that the inspecting step for pin hole inspection of all the produced articles is indispensable. Therefore, in the process of producing such ultra-thin shaped rubber articles, it is also an important theme how to prevent formation of pin holes during the steps of the production and how to increase the yield of the articles.

DESCRIPTION OF THE INVENTION

In consideration of the above-mentioned viewpoints, we the present inventors earnestly made repeated studies about a shaping mold for production of ultra-thin shaped rubber articles, with which mold a troublesome operation of peeling a shaped article from the shaping mold followed by re-mounting it on a different inspecting mold for its inspection in the inspecting step may be omitted, while preventing as much as possible formation of pin holes in the shaped article in the successive steps especially in the heat-drying step, and also about a method of producing ultra-thin shaped rubber articles using such a shaping mold. As a result, we have completed the present invention.

Accordingly, one object of the present invention is to provide a novel shaping mold for production of ultra-thin shaped rubber articles, with which mold such a troublesome operation of "peeling a shaped article from the shaping mold followed by re-mounting it on a different inspecting mold for its inspection" in the inspecting step may be omitted, while preventing as much as possible formation of pin holes in the shaped article in the successive steps.

Another object of the present invention is to provide a novel shaping mold for production of ultra-thin shaped rubber articles, which mold is lightweight and is well workable to be easily shaped to various shapes. Especially, the mirror finish of the surface of the novel mold is easy, which is requisite to a shaping mold for production of condoms.

Still another object of the present invention is to provide a novel method of producing ultra-thin shaped rubber articles, using such a shaping mold for production of ultra-thin shaped rubber articles, which method does not need a troublesome operation of "peeling a shaped article from the shaping mold followed by re-mounting it on a different inspecting mold for its inspection" in the inspecting step, while preventing as much as possible formation of pin holes in the shaped article in the successive steps.

Specifically, the present invention is a shaping mold for production of ultra-thin shaped rubber articles, which mold is characterized in that its main body is dipped in a latex liquid so as to make the latex adhered to the surface of the main body and the adhered latex is heat-dried to form an ultra-thin shaped rubber article. At least the surface of the main body of the shaping mold of the present invention to be dipped in a latex liquid is made of an amorphous carbon, and the bottom part of the mold is fitted with electrifying electrodes and has therebetween a heating area to be heated by resistance heating due to its electrification.

The present invention is also a method of producing ultra-thin shaped rubber articles, using such a shaping mold that at least the surface of its main body to be dipped in a latex liquid is made of an amorphous carbon and that its bottom part is fitted with electrifying electrodes and has therebetween a heating area to be heated by resistance heating due to its electrification, the method comprising;

(a) a dipping step of successively dipping the shaping molds in a latex liquid so as to make the latex adhered to the surfaces of the shaping molds, (b) a heat-drying step of electrifying the shaping molds so as to heat their heating areas by resistance heating to thereby heat and dry the latex as adhered to the surfaces of the shaping molds, and (c) an inspecting step of directly dipping the shaped articles as shaped on the shaping molds in an electrolytic solution, without removing them from the molds, followed by electrifying the molds for effecting pin hole inspection of the shaped articles.

It is indispensable that at least the surface of the the main body of the shaping mold of the present invention, which main body is dipped in a latex liquid during use of the mold, is made of an amorphous carbon, but the parts of the mold other than the surface of the main body thereof may be made of either an amorphous carbon like the surface of the main body or any other material of, for example, ordinary graphite materials, ceramics, electroconductive ceramics, glass, porcelain and the like. If the necessary mechanical strength of the shaping mold is ensured, the mold may be a hollow one. The amorphous carbon of forming the main body of the mold has a bulk density of generally from 1.0 g/cm$^3$ to 1.9 g/cm$^3$, which is lower than that of glass or porcelain and is much lower than that of electroconductive ceramics. Accordingly, the shaping mold of present invention may be lightweight.

It is also indispensable that the bottom part of the shaping mold has a heating area to be heated by resistance heating due to its electrification in order that heating from the side of the shaping mold is possible when the latex as adhered to the surface of the main body of the mold is heat-dried. For this purpose, at least the heating area to be formed in the bottom part is desired to have an intrinsic resistivity of from 0.00001 Ω.cm to 0.1 Ω.cm, preferably from 0.0001 Ω.cm to 0.01 Ω.cm, and the heat transfer coefficient from the heating area of the bottom part to the main body is desired to be from 0.00001 cal/cm.sec. ° C. to 10 cal/cm.sec. ° C., preferably from 0.0001 cal/cm.sec. ° C. to 5 cal/cm.sec. ° C. By suitably selecting the intrinsic resistivity of the bottom part and the heat transfer coefficient from the bottom part to the main body each falling within the above-mentioned range, the heat as generated in the heating area of the bottom part may be efficiently transferred to the main body in which the latex as adhered to the main body may be heat-dried advantageously. The bottom part of the shaping mold may be modified for the purpose of elevating the electric resistance of the part in order to ensure sufficient resistance heating in the heating area to be formed in the part. For instance, the bottom part may be made of a different material having a high electric resistance, or it may have a double-spiral structure so as to elevate the electric resistance of the part, or additives such as ceramics, glass or the like may be added thereto so as to also elevate the electric resistance of the part.

It is further necessary that the bottom part is fitted with electrodes so as to electrify the above-mentioned heating area therewith or to electrify the main body therewith for pin hole inspection of the shaped article as formed on the surface of the body. For instance, the part may be fitted with leading electrodes having a substrate of, for example, carbon, plastics, metals, glass, ceramics or the like, as attached thereto with an electroconductive adhesive such as BT-101 (trade name by NISSHINBO INDUSTRIES, INC.); or it may be wound with a band-like amorphous carbon.

At least the surface of the main body of the shaping mold of the present invention, which is dipped in a latex liquid in its use, is made of an amorphous carbon. Such an amorphous carbon for use in the present invention may be produced by carbonizing, for example, a high polymer material such as phenolic resins, polyacrylonitriles, polyimides, polyvinyl chlorides, polycarbodiimides, polyvinylidene chlorides, furan resins and the like by conventional known methods.

Especially preferred as the method of producing an amorphous carbon is a method using polycarbodiimide as a starting material, for example, the methods as described in Japanese Patent Application Laid-Open Nos. 2-152167 and 3-247504. The amorphous carbon as produced by the methods has the advantage of low porosity and high mechanical strength.

The method of producing ultra-thin shaped rubber articles, using the above-mentioned shaping mold, at least comprises (a) a dipping step of successively dipping the shaping molds in a latex liquid so as to make the latex adhered to the surfaces of the shaping molds, (b) a heat-drying step of electrifying the shaping molds so as to heat their heating areas by resistance heating to thereby heat and dry the latex as adhered to the surfaces of the shaping molds, and (c) an inspecting step of directly dipping the shaped articles as shaped on the shaping molds in an electrolytic solution, without removing them from the molds, followed by electrifying the molds for effecting pin hole inspection of the shaped articles.

The latex to be used in the above-mentioned dipping method (a) is not specifically defined but it may be a latex of, for example, natural rubber as well as butadiene-styrene synthetic rubber (SBR), butadiene-acrylonitrile synthetic rubber (NBR), butyl rubber, chloroprene rubber (CR), silicone rubber, polyacrylic rubber, fluorine-containing rubber, polyurethane rubber, polyisoprene, Hypalon rubber or the like.

In the heat-drying step (b), the bottom part of the shaping mold is electrified so as to heat the heating area to a determined temperature, and the main body to which the latex has adhered is heated due to the thermal conduction from the bottom part to the main body whereby the latex as adhered to the main body is heated and dried from its inside. It is preferred that the heat-drying step is combined with external heating with an electric furnace or the like, like a conventional heating step, whereby the whole of the adhered latex may be uniformly heated and dried under the condition free from any extreme temperature difference in the direction of its thickness so that formation of pin holes in the dried latex may be prevented more surely. In this way, since the latex as adhered to the main body of the shaping mold is heated and dried from its inside, formation of pin holes in the ultra-thin shaped articles may be prevented as much as possible. In carrying out the step, the heating temperature at the main body of the shaping mold, the heating temperature by the external heating and the heating times for the heating may suitably be defined, depending upon the kind of the latex as used as well as the amount of the latex as adhered to the main body. In general, the heating temperature at the main body may be approximately from 80° C. to 170° C., and the heating temperature by the external heating may be approximately from 80° C. to 170° C.

The shaped article as formed on the surface of the main body of the shaping mold in this way is then subjected to pin hole inspection in the next inspecting step (c). In general, pin hole inspection is effected in such a way that the shaped article to be inspected is covered over an inspecting mold, and the mold is dipped in an electrolytic solution and then electrified therethrough to check as to whether or not passing of the applied electricity is observed. If the passing of the applied electricity is observed in the test, the shaped article has some pin hole(s) in somewhere and it is dealt with as a defective article. In accordance with the method of the present invention, the shaping mold having thereon the shaped article as adhered to the surface of the main body thereof is directly dipped in an electrolytic solution and the shaping mold is used as the inspecting mold. Regarding the concrete inspecting method and conditions in the step, those of a conventional known method may apply to the method of the present invention.

BEST MODES OF CARRYING OUT THE INVENTION

Figure 1:
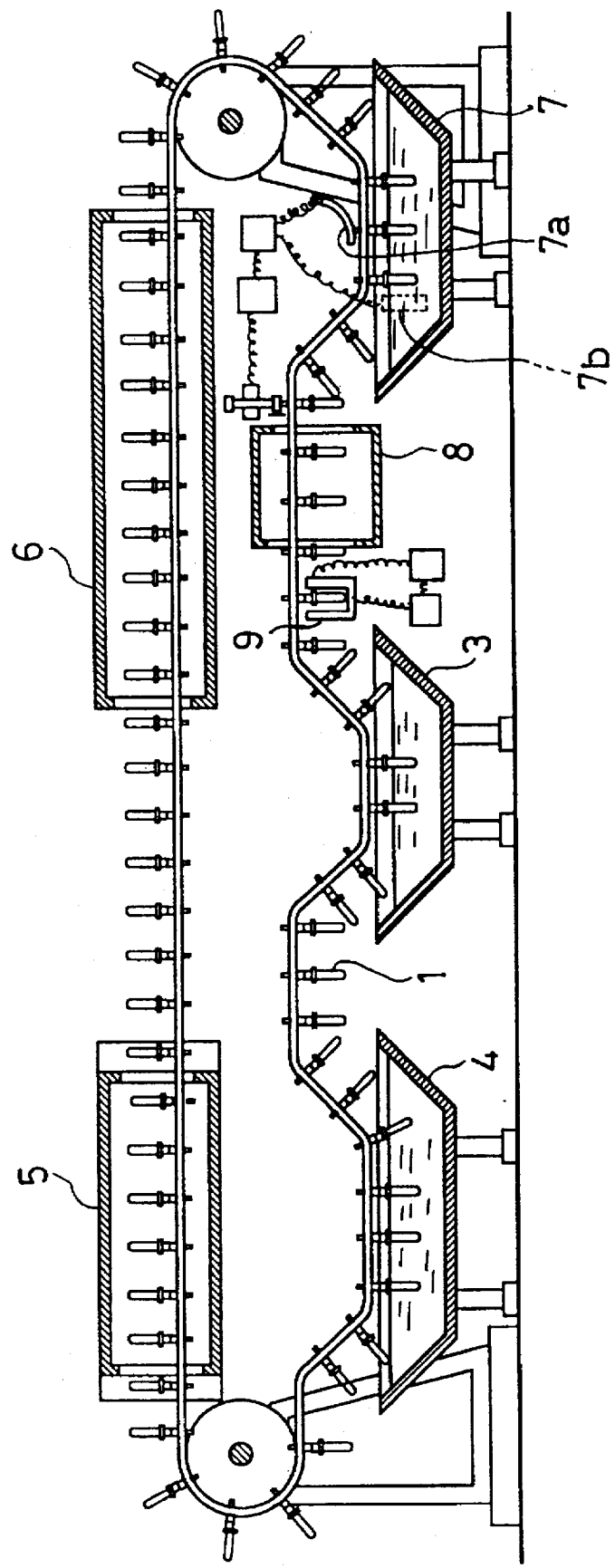
FIG. 1 shows the method of producing ultra-thin shaped rubber articles of Example 1 of the present invention, and it is an explanatory view of the production line for producing condoms.

The present invention will be explained concretely hereunder, on the basis of the examples as illustrated in the drawings attached hereto.

EXAMPLE 1

FIG. 1 shows a condom-producing line of one embodiment of the present invention. The condom-producing line is basically composed of an endless belt 2 on which a number of shaping molds 1 for producing condoms of the present invention have been mounted, a washing tank 3 for washing the shaping molds 1, a latex liquid tank 4 where the the main bodies of the washed shaping molds 1 are dipped in a latex liquid therein, a pre-heating room 5 where the latex as adhered to the main bodies of the shaping molds 1 is preliminarily heated and dried, a heat-drying room 6 where the shaped articles as pre-heated in the pre-heating room 5 are again heated and dried after the upper portion of each pre-heated shaped article has been rolled with fingers to form a reinforced part at the opening of the product to be a condom, an electrolytic solution tank 7 where the condom as dried in the heat-drying room 6 and adhered to the surface of the main body of the shaping mold 1 is subjected to pin hole inspection, a product drying room 8 where the condoms as passed through the electrolytic solution tank 7 is finally dried, and a peeling device 9 where the product condom is peeled from the shaping mold 1 with removing the condoms as judged to be defective ones when they have passed through the electrolytic solution tank 7.

In the above-mentioned pre-heating room 5 and heat-drying room 6, each shaping mold 1 is electrified so as to heat the heating area thereof by resistance heating in addition to the external heating to the molds whereby the latex or semi-dried latex as adhered to the surface of the shaping molds 1 is heat-dried and cured. In the above-mentioned electrolytic solution tank 7, a direct current voltage for pin hole inspection is applied between the contact electrode 7a, which is kept in contact with the shaping mold 1, and the electrode 7b, which has been disposed in the electrolytic solution. Accordingly, while the shaping molds 1 pass through the electrolytic solution in the electrolytic solution tank 7, an electric current flows therethrough via pin hole(s), if any, of the condom as adhered to the main body of the shaping mold 1 so that the condom is detected to be a defective one as having pin hole(s). The tank 7 is so constituted that the information derived from the detection is transmitted to the peeling device 9 so as to remove the defective condoms.

Figure 2:
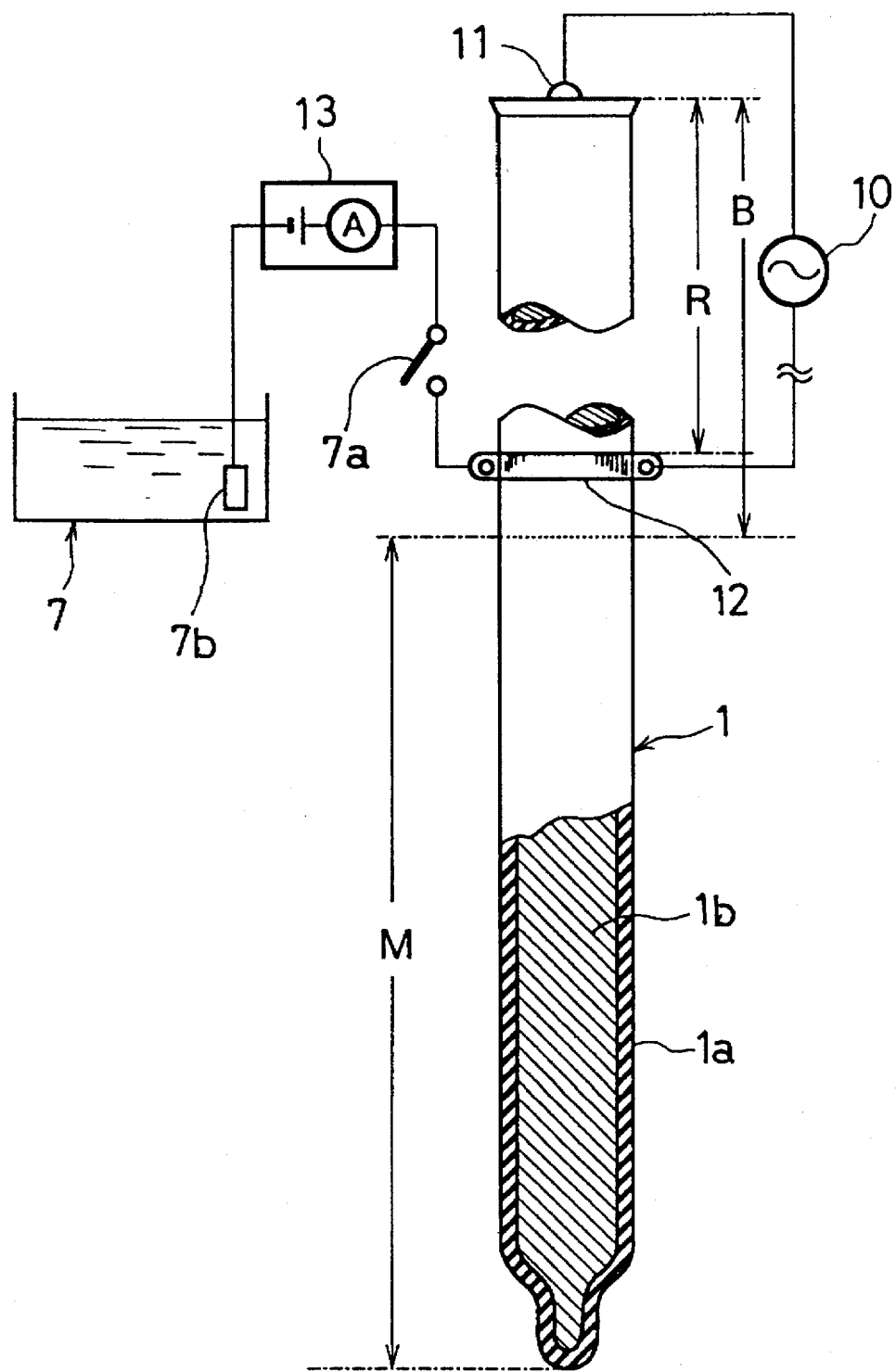
FIG. 2 is a shaping mold for production of condoms of Example 1 of the present invention, and it is a partly-cut explanatory view of showing the shaping mold as used in the condom-producing line of FIG. 1.
Figure 3:
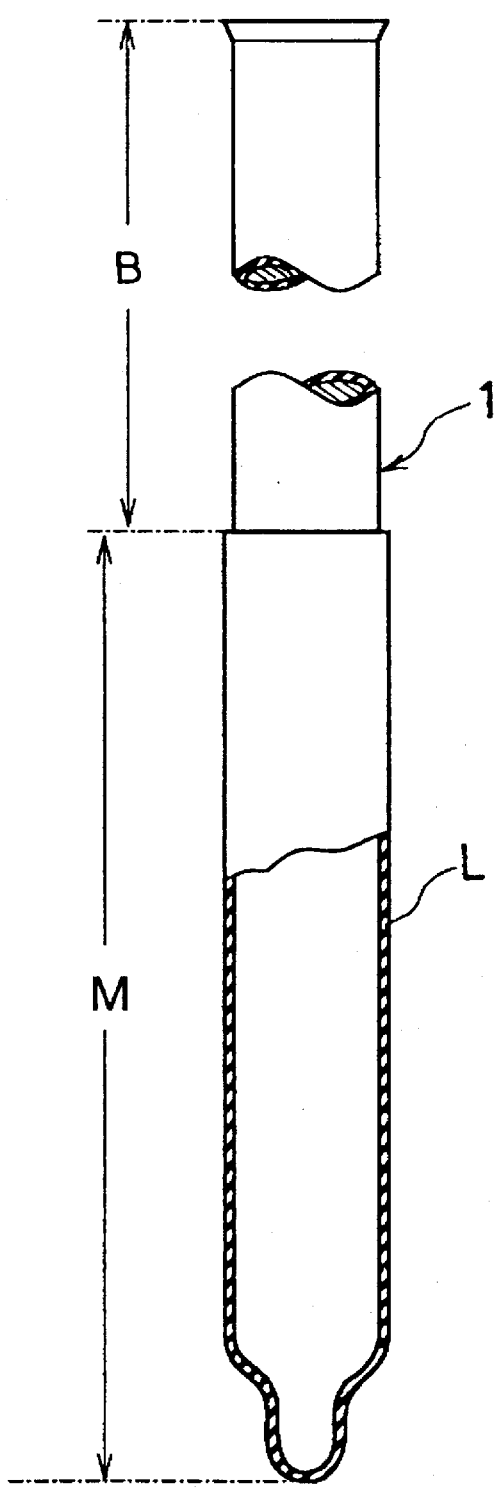
FIG. 3 is an explanatory view like FIG. 2, showing the condition where a latex has adhered to the main body of the shaping mold of FIG. 2 in the condom-producing line of FIG. 1.

The body of the shaping mold 1 as used in Example 1 is, as shown in FIG. 2, composed of the main body M which is dipped in a latex liquid in its use and the bottom part B which is above the main body M and is not dipped in a latex liquid. The main body M and the bottom part B are composed of the core part 1b made of an isotropic graphite material and the surface part 1a of an amorphous carbon as laminated over the surface of the part 1b. The upper portion of the mold body is fitted with a heating electrode 11 which is to be connected to the alternating current heating source 10 when the shaping mold 1 is in the pre-heating room 5 and the heat-drying room 6 and also with a band-like electrode 12 made of an amorphous carbon with maintaining the heating area R from the heating electrode 11. The band-like electrode 12 made of an amorphous carbon is not only one electrode to be connected to the above-mentioned alternating current heating source 10 but also acts as a contact terminal which is brought into contact with the contact electrode 7a of the direct current voltage source 13 for pin hole inspection of shaped condoms while the shaping mold 1 is passing through the electrolytic solution tank 7, whereupon it short-circuits with the electrode 7b as disposed in the electrolytic solution in the electrolytic solution tank 7 when the shaped condom has some pin hole(s).

Figure 4:
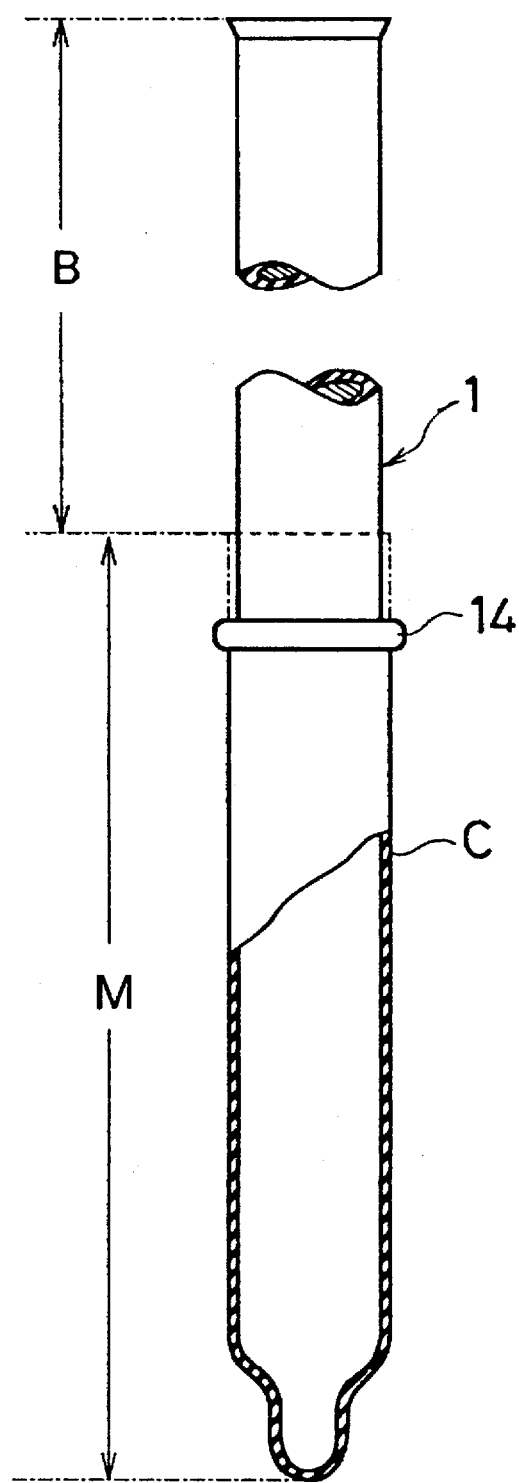
FIG. 4 is an explanatory view like FIG. 2, showing the condition where a shaped condom has adhered to the surface of the main body of the shaping mold of FIG. 2 in the condom-producing line of FIG. 1.

The main body M of the shaping mold 1 of Example 1 is dipped in the latex liquid in the latex liquid tank 4. After the latex liquid tank 4, a determined amount of a latex L has adhered to the surface of the main body M to form a film of a determined thickness. Then, it is preliminarily heated and dried in the pre-heating room 5 and thereafter completely heated and dried in the heat-drying room 6, whilst the upper portion of the shaped film is rolled with fingers, as shown in FIG. 4, to form the reinforced part 14 at the opening of the shaped product condom C.

Next, the shaping molds for production of ultra-thin shaped rubber articles of the present invention, including the shaping mold 1 as used in Example 1, and methods of forming them will be explained hereunder.

Preparation of Raw Materials of Polycarbodiimides

Preparation Example 1

54 g of a mixture (2,4-TDI/2,6-TDI=80/20) of 2,4-tolylene diisocyanate (2,4-TDI) and 2,6-tolylene diisocyanate (2,6-TDI) were reacted at 120° C. for 4 hours in 500 ml of tetrachloroethylene in the presence of 0.12 g of a carbodiimidating catalyst (1-phenyl-3-methylphospholene oxide) to obtain a polycarbodiimide solution.

Preparation Example 2

50 g of methylenediphenyl diisocyanate (MDI) were reacted at 120° C. for 6 hours in 820 ml of tetrachloroethylene in the presence of a carbodiimidating catalyst (1-phenyl-3-methylphospholene oxide), and the obtained reaction mixture was cooled to room temperature to precipitate the formed polycarbodiimide, which was then filtered. The precipitates thus obtained were dried at 100° C. for 2 hours to obtain a polycarbodiimide powder.

Formation of Shaping Molds

EXAMPLE 2

An isotropic graphite material (having a bulk density of 1.83 $g/cm^3$ and a flexural strength of 500 $kg/cm^2$) was worked into a shape of the core part 1b of FIG. 2, and the polycarbodiimide solution as obtained in the above-mentioned Preparation Example 1 was coated over its surface by spray coating. Then, this was dried at 80° C. for 3 hours, at 120° C. for 4 hours and at 200° C. for one hour.

The shaped body thus formed was heated in nitrogen gas from room temperature up to 1,000° C., 1,500° C., 2,000° C. or 2,500° C. each at a temperature-elevating rate of 10° C./min and was carbonized at the elevated temperature, whereby the surface layer 1a of amorphous carbon was laminated over the core part 1b. The thickness of the surface layer 1a thus formed was from 1 to 3 μm.

The shaping mold 1 thus formed was checked with respect to the wettability with a natural rubber latex liquid, the intrinsic resistivity value and the thermal conductivity. The results obtained are shown in Table 1 below.

EXAMPLE 3

The polycarbodiimide solution as obtained in Preparation Example 1 was concentrated with an evaporator to have a resin solid content of 50% by weight. The thus obtained high-concentration polycarbodiimide solution was cast into a mold and heat-treated therein at 60° C. for 20 hours, at 80° C. for 20 hours and at 120° C. for 20 hours. The shaped body was released from the mold to obtain a hollow-shaped polycarbodiimide resin body of FIG. 5.

Figure 5:
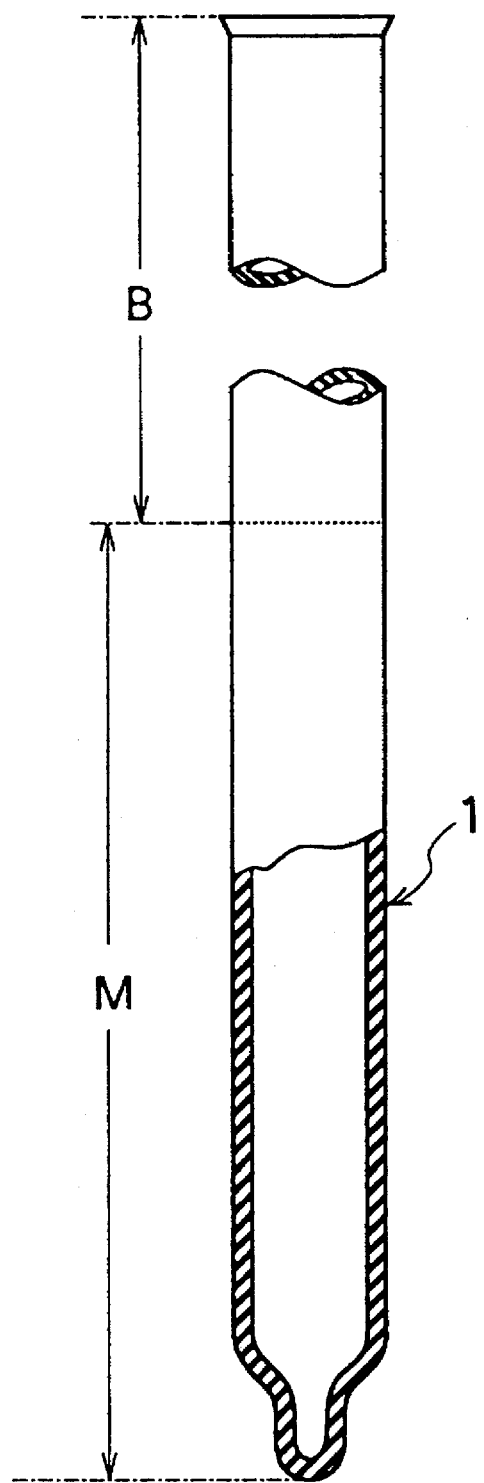
FIG. 5 is a partly-cut explanatory view of showing the shaping mold for production of condoms as formed in Example 2.

The shaped polycarbodiimide resin body was heated in nitrogen gas from room temperature up to 1,000° C., 1,500° C., 2,000° C. or 2,500° C. each at a temperature-elevating rate of 0.2° C./min and was carbonized at the elevated temperature. Thus, a hollow shaping mold 1 wholly made of an amorphous carbon was formed, as shown in FIG. 5.

The shaping mold 1 thus formed was checked with respect to the wettability with a natural rubber latex liquid, the intrinsic resistivity value and the thermal conductivity. The results obtained are shown in Table 1 below.

EXAMPLE 4

Figure 6:
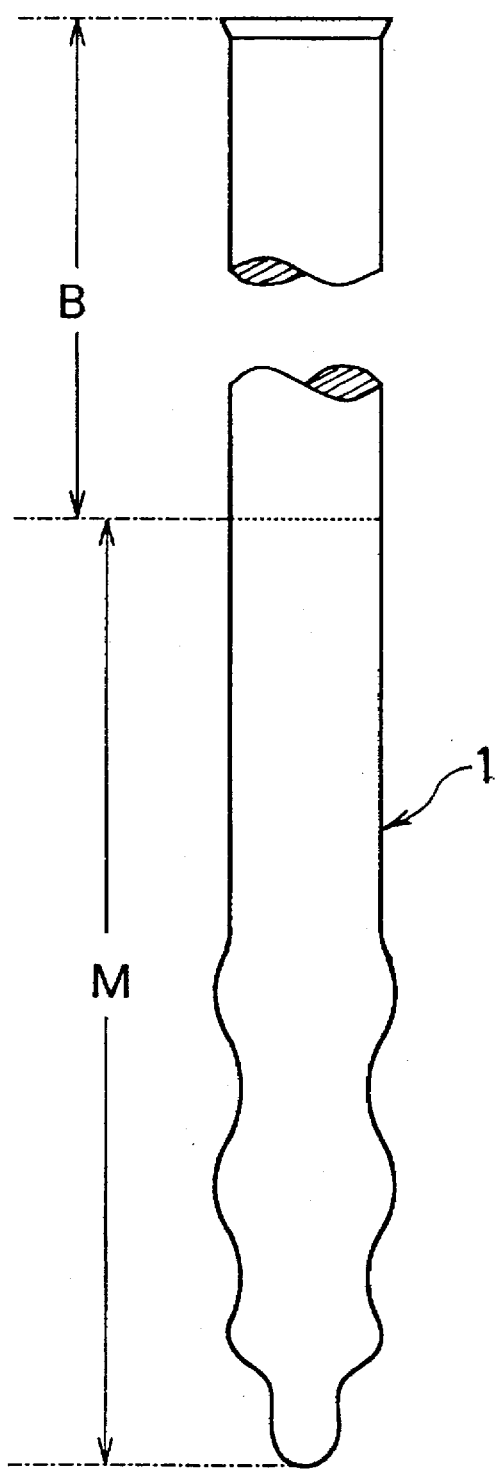
FIG. 6 is a partly-cut explanatory view of showing the shaping mold for production of condoms as formed in Example 3.

The polycarbodiimide powder as obtained in Preparation Example 2 was put in a mold and shaped under heat and pressure under the condition of 180° C. and 80 $kg/cm^2$, and this was cooled to room temperature and released from the mold to obtain a shaped polycarbodiimide resin body having the shape of FIG. 6.

The surface of the shaped polycarbodiimide resin body was ground to mirror finish, and the body was carbonized under the same conditions as those in the above-mentioned Example 3 to give a shaping mold 1 of FIG. 6.

The shaping mold 1 thus formed was checked with respect to the wettability with a natural rubber latex liquid, the intrinsic resistivity value and the thermal conductivity. The results obtained are shown in Table 1 below.

EXAMPLE 5

Using a phenolic resin (BRL-274, produced by Showa Highpolymer Co.), a shaped phenolic resin body was formed under the same conditions as those in Example 3. This was carbonized under the same conditions as those in Example 3 to give a hollow shaping mold 1 wholly made of an amorphous carbon, as shown in FIG. 5.

The shaping mold 1 thus formed was checked with respect to the wettability with a natural rubber latex liquid, the intrinsic resistivity value and the thermal conductivity. The results obtained are shown in Table 1 below.

vented as much as possible. In addition, the shaping mold for production of ultra-thin shaped rubber articles of the present invention is lightweight and is well workable to various shapes with ease. In particular, the surface of the mold is easily worked to mirror finish which is indispensable to a shaping mold for production of condoms.

Moreover, since the method of producing ultra-thin shaped rubber articles of the present invention uses the above-mentioned shaping molds, all the steps of constituting the method, including the inspecting step, may be carried out continuously with one shaping mold without interrupting the course of continuous production of ultra-thin shaped rubber articles. Accordingly, since not only the production efficiency of the method may be elevated but also formation of pin holes in the shaped articles to be produced by the method

TABLE 1

| Example | Carbonizing Temperature (°C.) | Evaluation of Wettability | Intrinsic Resistivity ($\Omega \cdot cm$) | Thermal Conductivity ($cal/cm \cdot sec. °C.$) |
|---|---|---|---|---|
| 2 | 1,000 | O | 0.0006 | 0.3 |
|   | 1,500 | O | 0.0006 | 0.3 |
|   | 2,000 | O | 0.0006 | 0.3 |
|   | 2,500 | O | 0.0006 | 0.3 |
| 3 | 1,000 | O | 0.0051 | 0.010 |
|   | 1,500 | O | 0.0048 | 0.015 |
|   | 2,000 | O | 0.0046 | 0.020 |
|   | 2,500 | O | 0.0040 | 0.035 |
| 4 | 1,000 | O | 0.0052 | 0.010 |
|   | 1,500 | O | 0.0048 | 0.016 |
|   | 2,000 | O | 0.0048 | 0.022 |
|   | 2,500 | O | 0.0040 | 0.035 |
| 5 | 1,000 | O | 0.0050 | 0.010 |
|   | 1,500 | O | 0.0048 | 0.014 |
|   | 2,000 | O | 0.0046 | 0.021 |
|   | 2,500 | O | 0.0040 | 0.034 |

(Note) For the evaluation of the wettability, the mark "O" indicates that production of condoms with the mold is possible.

EXAMPLE 6

Figure 7:
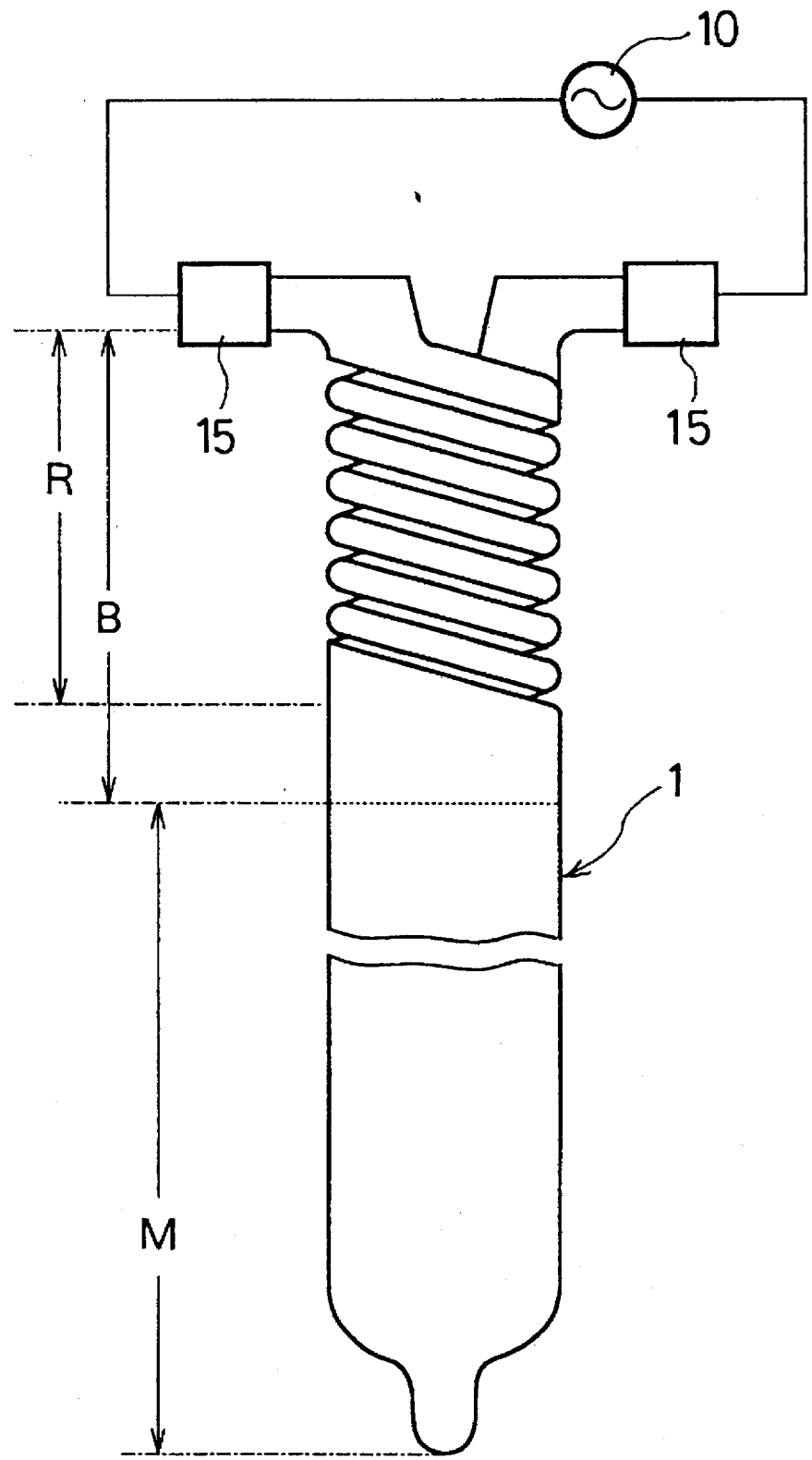
FIG. 7 is a partly-cut explanatory view of showing the shaping mold for production of condoms as formed in Example 4.

The polycarbodiimide powder as obtained in Preparation Example 2 was put in a mold and formed into a shaped polycarbodiimide resin body in the same manner as in Example 4. The bottom part B of the body was cut into the double-spiral form of FIG. 7, while the surface of the main body M of the shaped polycarbodiimide resin body was ground to mirror finish. This was carbonized under the same conditions as those in the above-mentioned Example 3 to give a shaping mold 1 of FIG. 7.

Using the shaping mold 1 of this example where the double-spiral area as formed in the bottom part B may be a heating area R having a higher electric resistance, more efficient resistance heating may be attained. In the shaping mold 1 of this example, 15 is an electrode of the alternating current heat source 10.

INDUSTRIAL APPLICATION

As is obvious from the results of the above-mentioned examples, when the shaping mold for production of ultra-thin shaped rubber articles of the present invention is used in producing ultra-thin shaped rubber articles, the troublesome operation of "peeling a shaped article from the shaping mold followed by re-mounting it on a different inspecting mold for its inspection" in the inspecting step may be omitted and, additionally, the shaped article may be heat-dried from the inside of the shaping mold during the process of producing it, especially in the heat-drying step, so that formation of pin holes in the shaped articles may be prevented as much as possible, the method is extremely useful for industrial use.

We claim:

1. A shaping mold for the production of ultra-thin shaped rubber articles, comprising
   a main body having a surface for the adherence of liquid latex, said surface being made of an amorphous carbon; and
   a bottom part that is in contact with said main body, said bottom part having electrodes fitted thereto, said electrodes defining a heating area which is made of a material that heats upon the application of electricity to the electrodes.

2. The shaping mold for production of ultra-thin shaped rubber articles as claimed in claim 1, wherein the mold has a core part which is made of a graphite material and is laminated with a surface layer of an amorphous carbon over its surface.

3. The shaping mold for production of ultra-thin shaped rubber articles as claimed in claim 1, wherein said mold is hollow and has an opened bottom part; said mold being made wholly of an amorphous carbon.

4. The shaping mold for production of ultra-thin shaped rubber articles as claimed in claim 1, wherein the amorphous carbon surface of said main body is formed by shaping a resin selected from the group consisting of polycarbodiimides, phenolic resins, polyacrylonitriles, polyimides, polyvinyl chlorides, polyvinylidene chlorides and furan resins, followed by carbonizing the shaped resin.

5. The shaping mold for production of ultra-thin shaped rubber articles as claimed in claim 1, wherein the amorphous carbon has a bulk density of from about 1.0 $g/cm^3$ to 1.9 $g/cm^3$.

6. The shaping mold for production of ultra-thin shaped rubber articles as claimed in claim 1, wherein said heating area of said bottom part has an intrinsic resistivity of from 0.00001 Ω.cm to 0.1 Ω.cm.

7. The shaping mold for production of ultra-thin shaped rubber articles as claimed in claim 6, wherein said heating area of said bottom part has an intrinsic resistivity of from 0.001 Ω.cm to 0.01 Ω.cm.

8. The shaping mold for production of ultra-thin shaped rubber articles as claimed in claim 1, wherein the heating area of said bottom part has a heart transfer coefficient from the heating area to the main body of from 0.0001 cal/cm.sec.° C. to 5 cal/cm.sec. ° C.

9. The shaping mold for production of ultra-thin shaped rubber articles as claimed in claim 1, wherein said amorphous carbon was formed by carbonizing a polycarbodiimide or a phenolic resin.

10. The shaping mold for production of ultra-thin shaped rubber articles as claimed in claim 4, wherein said carbonizing step is carried out by heating to a temperature from 1000° C. to 2000° C.

11. The shaping mold for production of ultra-thin shaped rubber articles as claimed in claim 9, wherein said carbonizing step is carried out by heating to a temperature from 1000° C. to 2000° C.

* * * * *